United States Patent [19]

Stadler et al.

[11] Patent Number: 4,965,477
[45] Date of Patent: Oct. 23, 1990

[54] INTEGRATED DRIVE GENERATOR WITH PERMANENT MAGNET GENERATOR ON SECOND SHAFT

[75] Inventors: Jeffrey A. Stadler; Wayne A. Flygare, both of Rockford, Ill.

[73] Assignee: Sundstrand Corporation, Rockford, Ill.

[21] Appl. No.: 324,755

[22] Filed: Mar. 17, 1989

[51] Int. Cl.[5] .................. H02K 19/26; H02K 16/00; H02K 23/60; H02K 7/20
[52] U.S. Cl. .................... 310/114; 290/1 C; 310/83; 310/90; 310/118; 322/29
[58] Field of Search ............ 74/686; 290/1 C; 310/83, 90, 112, 114, 118, 121; 322/29, 46

[56] References Cited

U.S. PATENT DOCUMENTS

| | | | |
|---|---|---|---|
| 4,609,842 | 9/1986 | Aleem et al. | 74/686 |
| 4,625,160 | 11/1986 | Hucker | 310/118 |
| 4,728,841 | 3/1988 | Sugden | 310/114 |
| 4,734,590 | 3/1988 | Fluegel | 290/1 C |
| 4,743,776 | 5/1988 | Baehler et al. | 290/31 |
| 4,797,590 | 1/1989 | Raad et al. | 310/112 |

OTHER PUBLICATIONS

Sundstrand, "Electrical Power Generating System for the Douglas C-17A Aircraft", Proposal 3090A-P3, Jun. 8, '87.

Primary Examiner—Patrick R. Salce
Assistant Examiner—D. L. Rebsch
Attorney, Agent, or Firm—Antonelli, Terry, Stout & Kraus

[57] ABSTRACT

An integrated drive generator (40) for generating constant frequency alternating current which is driven by a drive shaft (12) at variable rotational speeds includes an alternating current generator (23) having a rotor (37) mounted on a first shaft (42), which is driven by an output of a constant speed drive (14) at a fixed rotational velocity, the constant speed drive also driving a second shaft (44) at a fixed rotational velocity; an exciter (20) having a rotor (32) mounted on the first shaft, electrically coupled to a field winding of the generator, for supplying electrical power to the field winding of hte alternating current generator; and a permanent magnet generator (18) having a rotor (24) mounted on the second shaft, electrically coupled to the exciter, for supplying electrical power to a field winding of the exciter. Using the second shaft reduces weight, as well as length.

33 Claims, 3 Drawing Sheets

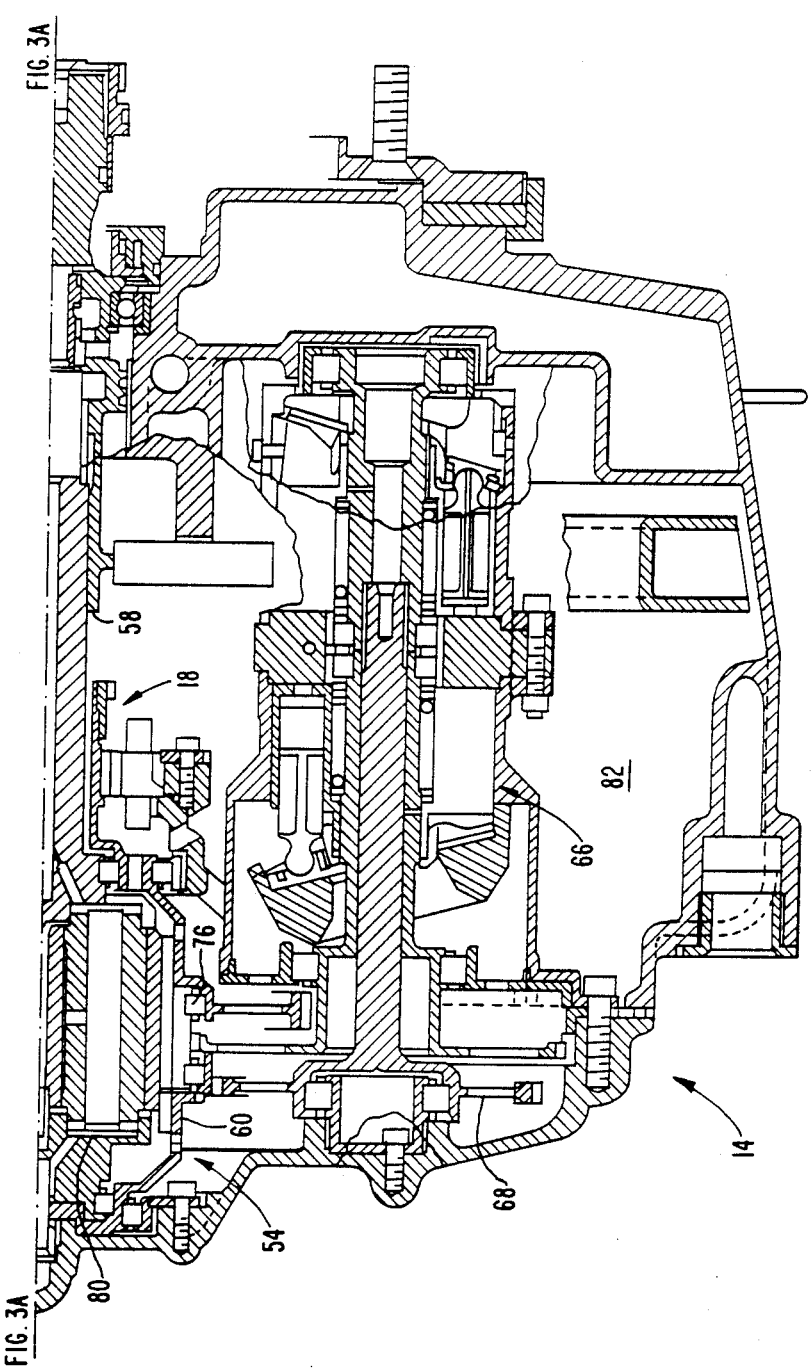

INTEGRATED DRIVE GENERATOR WITH PERMANENT MAGNET GENERATOR ON SECOND SHAFT

TECHNICAL FIELD

The present invention relates to integrated drive generators for generating constant frequency alternating current. More particularly, the present invention relates to integrated drive generators for use in airframes having reduced size and weight.

BACKGROUND ART

FIG. 1 illustrates a block diagram of an integrated drive generator 10 of a type manufactured by the assignee of the present invention for generating three phase 400 Hz 120 volt alternating current. The integrated drive generator 10 is driven by a power takeoff 12 from an airframe propulsion engine which varies in speed during operation of the airframe. The power takeoff 12 is coupled to a constant speed drive transmission 14 which functions to produce a constant speed output on shaft 16 while the rotational speed of the power takeoff varies. It should be understood that the construction of the constant speed drive transmission 14 is conventional. Furthermore the connection of the constant speed drive transmission to the shaft 16 is illustrated only schematically. The integrated drive generator 10 has a permanent magnet generator 18, wound field exciter 20 and main generator 22, each of conventional construction, having rotors mounted on shaft 16 which is supported by bearings (not illustrated) which are mounted in a housing (not illustrated) of the integrated drive generator. The permanent magnet generator 18 has a permanent magnet rotor 24 mounted on the shaft 16. The stator 26 of the permanent magnet generator 18 outputs alternating current which is rectified by rectifier 28 to produce field excitation current which is applied to the stator 30 of the wound field exciter 20. The rotor 32 of the wound field exciter, mounted on shaft 16, outputs alternating current which is rectified by rectifier 34. Rectified current from the rectifier 34 is applied to the field windings of the rotor 36 of the main generator 22. The stator 38 outputs three phase 400 Hz 120 volt alternating current for use in powering the various electrical loads on the airframe.

The weight and size of an integrated drive generator is of extreme importance in the design of airframes. Unnecessary weight lessens the overall efficiency of the airframe and its load carrying capability. Increased size in an integrated drive generator can interfere with the mounting of the integrated drive generator on the propulsion engine as a consequence of interference between the integrated drive generator and the cowling of the engine. Shortening of the overall length of the housing of the integrated drive generator with respect to the length of the drive shaft 16 is important in reducing weight, facilitating mounting of the integrated drive generator with respect to the engine cowling and reducing overhung moment which lessens the requirement for reinforcing of the mounting flange on the engine where the integrated drive generator is attached.

A four pole main generator 22 was utilized as a consequence of the rotor of a four pole main generator being shorter than a two pole generator of comparable power output, in order to shorten the length of the casing to reduce overhung moment. However, a four pole main generator 22 has a rotor 36 which has a larger diameter than a rotor of a two pole main generator of comparable power, which adds overall weight to the main generator over the overall weight of a two pole main generator of comparable power output. A two pole rotor 36 requires a longer rotor than the rotor of a corresponding four pole rotor, to produce the same amount of energy. The increased diameter of the shaft 16 necessary to support the rotors of the permanent magnet generator 18, wound field exciter 20 and main generator 22 increased the weight of the shaft with a concomitant overhung moment penalty and presented more difficult spatial requirements of mounting the integrated drive generator with respect to the cowling of the airframe propulsion engine.

DISCLOSURE OF INVENTION

The present invention provides an integrated drive generator for generating constant frequency alternating current having reduced weight and length which is particularly suited for applications of generating constant frequency alternating current in airframes. With the invention, the wound field exciter and main generator are mounted on a first shaft driven at a constant speed by an output of a constant speed drive and a permanent magnet generator is mounted on a second shaft also driven at a constant speed by an output of the constant speed drive. Preferably the first and second shafts are driven by the same output of the constant speed drive with a speed ratio between the shafts being established by a suitable gear drive.

Placing the rotors of the wound field exciter and the main generator on a first shaft and the rotor of the permanent magnet generator on a second shaft has a number of advantages. First, the rotor of the main generator may be a longer, lighter two pole design. The increased space available on the first shaft permits the longer lighter two pole rotor to be fit within the casing of the integrated drive generator, while shortening the overall length of the case which also saves weight. The overall diameter of the first shaft may be reduced as a consequence of the reduction in weight suspended by the shaft, and shortening of the shaft between bearings within the case. The smaller diameter shaft achieves an identical degree of radial stiffness as that achieved by the larger shaft utilized in the prior art. Preferably, the second shaft on which the rotor of the permanent magnet generator is mounted is driven at a speed less than the speed at which the first shaft is driven, on which the rotors of the wound field exciter and main generator are mounted. Driving the permanent magnet generator at a lower speed permits a permanent magnet generator with a greater number of poles to be used, which reduces the overall length of the permanent magnet generator, facilitating its being mounted on an output of a constant speed drive transmission without lengthening the case of the integrated drive generator. Additionally, bearings in the differential of the constant speed drive transmission are used for supporting the second shaft which is part of the differential, which reduces weight by not requiring an additional set of bearings. Additionally, mounting of the permanent magnet generator on the second shaft permits cooling oil, which is applied to the exterior of the stator of the main generator, to be coupled directly from the stator of the generator to a surface of the permanent magnet generator to permit its cooling.

An integrated drive generator for generating constant frequency alternating current, which is driven by a drive shaft at variable rotational speeds in accordance with the invention, includes a constant speed drive having an input coupled to the drive shaft and at least one output, which rotates at a fixed rotational velocity in response to the drive shaft rotating at a variable velocity, and which drives a first drive shaft at a fixed rotational velocity and a second drive shaft at a fixed rotational velocity; an alternating current generator having a rotor mounted on the first shaft; an exciter having a rotor mounted on the first shaft, electrically coupled to a field winding of the alternator, for supplying electrical power to a field winding of the alternating current generator; and a generator, having a rotor mounted on the second shaft, electrically coupled to the exciter, for supplying electrical power to a field winding of the exciter. Preferably, the at least one output of the constant speed drive driving the first and second shafts is the same output. Preferably, the generator, having the rotor mounted on the second shaft, has a permanent magnet rotor. The constant speed drive comprises a hydraulic pump and motor having an input shaft coupled to the drive shaft and an output; a differential with a first input coupled to the drive shaft, a second input coupled to the output of the hydraulic pump and motor and an output which is the output of the constant speed drive driving the first and second shafts. The fixed rotational velocity of the first shaft is greater than the fixed rotational velocity of the second shaft, with a ratio of the rotational velocities being constant. The output of the hydraulic pump and motor is coupled to a first ring gear; the output of a constant speed drive is coupled to a second ring gear which drives a gear connected to the first shaft; and the first ring gear is coupled to the second ring gear by a plurality of planetary gears. Preferably, the ratio of the velocities of the first shaft to the second shaft is 2:1. The integrated drive generator has a case containing first and second pairs of bearings for rotationally supporting the first and second shafts, the generator and exciter being disposed between the first pair of bearings and the output of the differential and the rotor of the permanent magnet generator being supported by the second pair of bearings. The alternating current generator rotor has two poles and the generator with a permanent magnet rotor has four poles.

The invention further includes an oil supply for providing pressurized oil during generation of alternating current by the alternating current generator; an oil passage at least partially encircling an outside periphery of a stator of the alternating current generator; and a channel connecting the oil passage to a surface of the permanent magnet generator, to conduct oil from the oil passage to the surface of the permanent magnet generator when the oil supply supplies pressurized oil to the oil passage to cool the alternating current generator, so as to cool the permanent magnet generator.

A commercial airframe power generating system in accordance with the present invention is the first integrated drive generator of the assignee with a two pole main alternating current generator which achieves substantial weight savings.

BEST MODE FOR CARRYING OUT THE INVENTION

Figure 1:
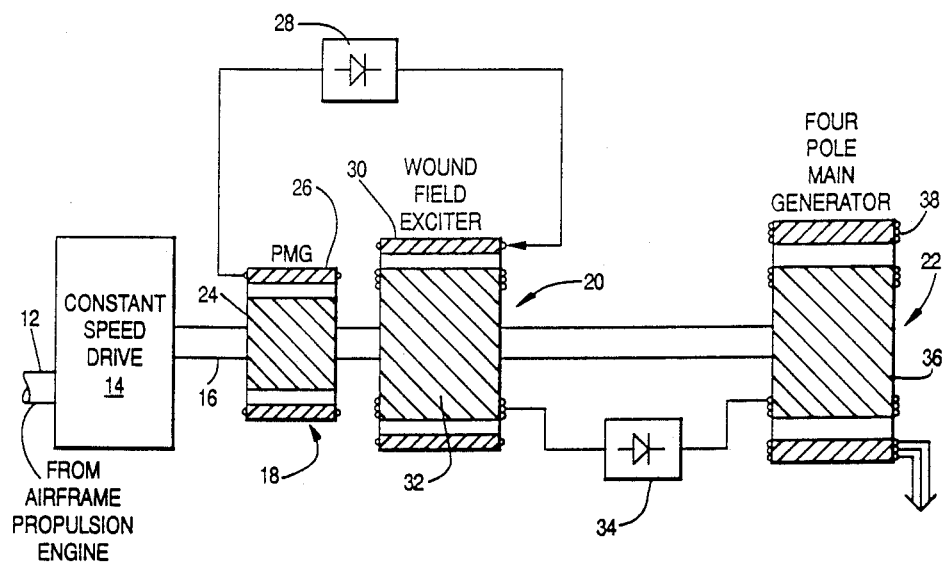
FIG. 1 illustrates a block diagram of a prior art integrated drive generator in accordance with integrated drive generators manufactured by the assignee of the present invention.
Figure 2:
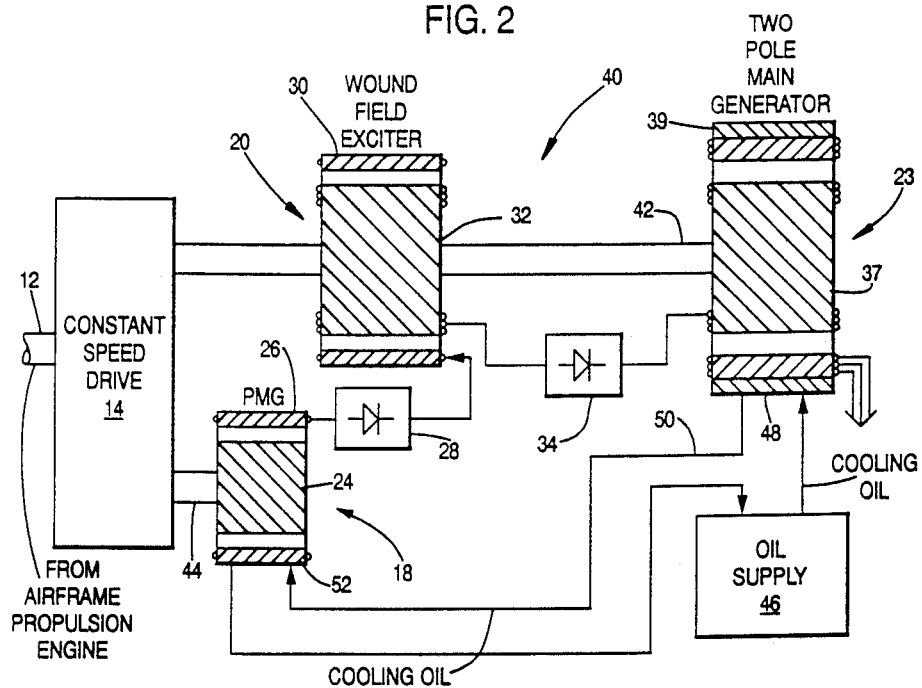
FIG. 2 illustrates a block diagram of an integrated drive generator in accordance with the present invention.
Figure 3A:
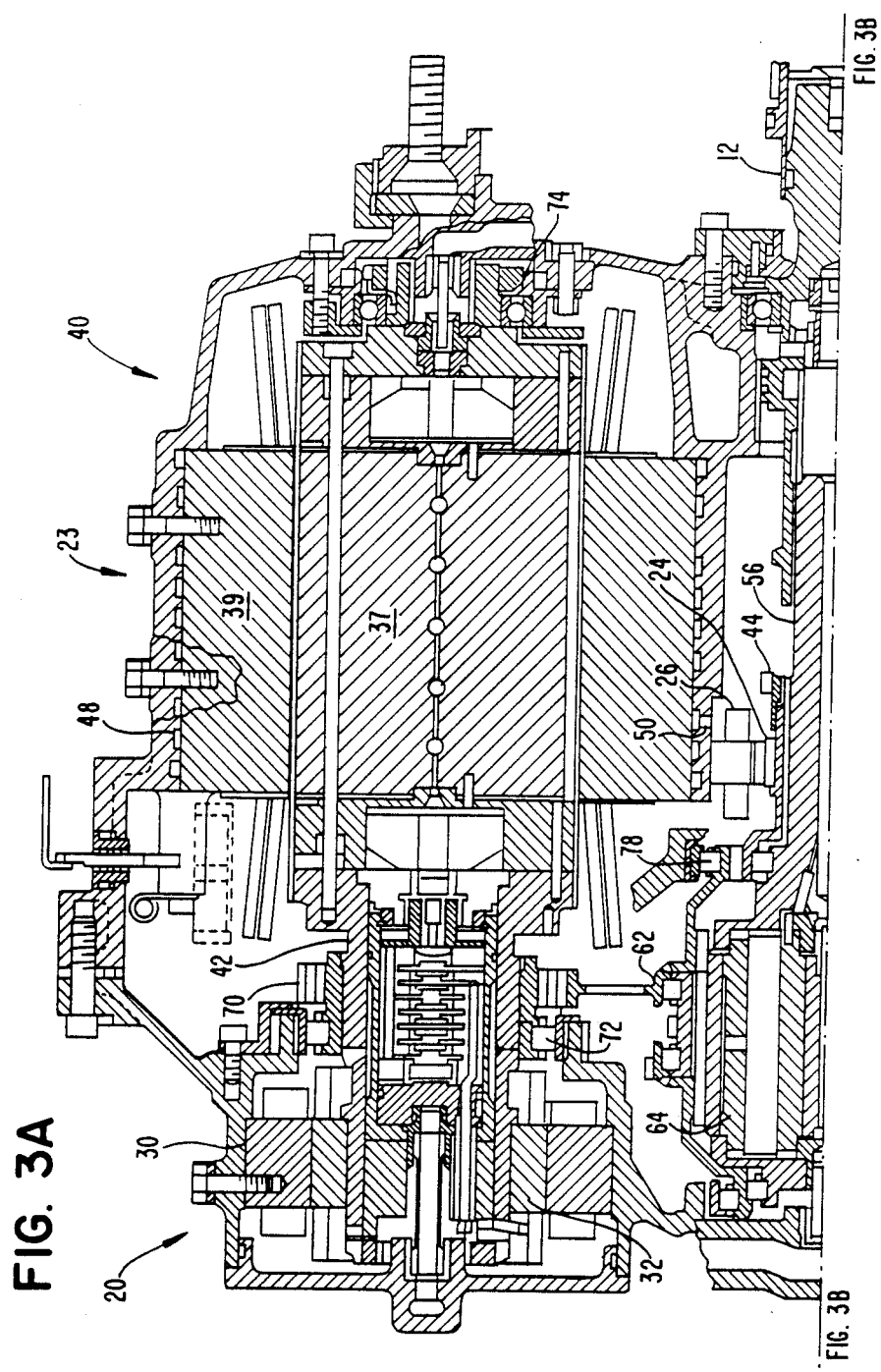
FIG. 3 illustrates a preferred embodiment of an integrated drive generator in accordance with the present invention.

FIG. 2 illustrates a block diagram of an integrated drive generator 40 in accordance with the present invention. Like reference numerals identify like parts in FIGS. 1 and 2, with identical parts in both figures functioning in an identical manner. Accordingly, parts which are not described in conjunction with FIG. 2 function in the manner described above with respect to FIG. 1. The present invention differs from the prior art of FIG. 1 in that the rotor 32 of the wound field exciter 20 and the rotor 37 of the main generator 23 are mounted on a first shaft 42, and the rotor 24 of the permanent magnet generator 26 is mounted on a second shaft 44. Both shafts 42 and 44 are rotationally supported by bearings mounted in the housing of the integrated drive generator (not illustrated). A ratio of the rotational velocity of the first shaft 42 to the second shaft 44 is greater than 1 and is constant during operation of the integrated drive generator in generating electrical power. In a preferred embodiment, as illustrated in FIG. 3, the ratio of the rotational velocity of the first shaft 42 to the second shaft 44 is 2:1. The constant speed drive 14 is illustrated schematically as having a pair of outputs which respectively drive shaft 42, driving rotor 32 of the wound field exciter 20, and the rotor 37 of the main generator 23 and drive shaft 44, driving the rotor 24 of the permanent magnet generator 18. However, it should be understood that the invention may be practiced with different configurations of a constant speed drive 14, including electrically powered constant speed drives, and further that a preferred embodiment of the invention as illustrated in FIG. 3 drives shafts 42 and 44 from a single output from the constant speed drive transmission. The first shaft 42 and the second shaft 44 are driven by a ring gear as described below in conjunction with FIG. 3. The back iron of the stator 39 of the main generator 22 is cooled by oil which flows through a passage in the outside periphery of the back iron as illustrated in FIG. 3. Cooling oil is provided from cooling oil supply 46 to the aforementioned passage 48 in the back iron of the stator 39. A channel 50 couples oil from the passage 48 in the back iron of the stator 39 to a surface 52 of the permanent magnet generator 18 which is sprayed with the pressurized oil for cooling purposes. The surface of the permanent magnet generator 18 which is cooled by oil flowing in passage 52 is determined by the position of the opening of the passage with respect to the permanent magnet generator. The oil runs off of the surface 52 of the permanent magnet generator 18 and is returned to the cooling oil supply 46, which may be the main oil pump contained within the housing of the integrated drive generator, that also provides oil for operation of a hydraulic pump and motor combination as described below with reference to FIG. 3.

The integrated drive generator 40 of FIG. 2 has several advantages over the prior art discussed above in conjunction with FIG. 1. In the first place, the overall length of the case of the integrated drive generator 40 in a commercial electrical power generating system for use in an airframe is reduced by 2" and the overall weight of the integrated drive generator is reduced in the aforementioned commercial electrical power generating system by approximately 8% over a configuration as illustrated in FIG. 1. The most significant weight reduction occurs as a result of utilizing a two pole main alternating current generator 23 by placing the PMG 18 on the second shaft 44, which permits a longer lighter two pole main generator to be mounted on the shaft 42 within the same casing length. With respect to two and four pole main generators having an identical power output, two pole generators are significantly lighter than four pole main generators with a weight savings of approximately 12 lbs. being achieved by utilizing the two pole generator 23 in the aforementioned commercial electrical power generating system. The weight savings of a two pole main generator 23 is much greater than the weight penalty of a four pole permanent magnet generator 18.

The overall weight reduction is further a consequence of the following attributes of the invention. The case of the integrated drive generator is shortened by mounting the permanent magnet generator on the second shaft 44 instead of on the shaft 16 as illustrated in FIG. 1. The mounting of the permanent magnet generator 18 on the second shaft 44 permits the overall diameter of the shaft 42 to be reduced as a consequence of its carrying a smaller rotational mass between the bearings supporting the shaft in the case, and the bearings supporting the shaft 42 being located closer together, which makes the shaft stiffer, permitting it to be downsized to maintain the same radial stiffness as in FIG. 1. Additionally, the bearing support for the permanent magnet generator 18 utilizes the existing bearing support for the differential of the constant speed drive 14, which results in a weight savings over that which would be achieved if the second shaft were supported by bearings which only supported the permanent magnet generator.

The invention has the following additional advantages. The present invention provides improved cooling of the permanent magnet generator 18 by utilizing pressurized oil supplied to the back iron of the stator 38 of the main generator to cool the permanent magnet generator. Furthermore, the permanent magnet generator 18 is preferably a four pole unit which, while being slightly heavier than a two pole unit of comparable power output, has a shorter rotor which permits the rotor 24 to fit on the same shaft 44 supporting the differential of the constant speed drive transmission without lengthening the case, which reduces overhung moment.

FIG. 3 illustrates a preferred embodiment of the present invention. Like reference numerals in FIGS. 2 and 3 identify like parts. Differential 54, which is of conventional construction, has a first input 56, connected to shaft 12 by a splined coupling 58, a second input 60 and an output 62 which is a first ring gear which is connected to the second shaft 44. Planetary gears 64 couple the second input 60, which is a second ring gear, to the output 62 in a conventional fashion. A conventional hydraulic pump-motor combination 66 is driven by input 12 by a gear drive and drives output 68 to drive the second input of the differential in conventional fashion to drive the output 62 at constant speed, independent of velocity changes in the input 12 from the airframe propulsion engine. The output ring gear 62 drives gear 70 attached to shaft 42. The gear ratio between the gear 70 and the gear output ring gear 62 is greater than unity, and as illustrated is two to one. As a consequence of the rotor 24 being attached to shaft 44, which is connected to output ring gear 62, the ratio of the velocity of the shafts 42 and 44 is two to one. The shaft 42 is rotationally supported by bearings 72 and 74. The shaft 44 is supported by the bearings 76 and 78 which also support the differential 80. The second shaft 44 is connected to differential 80 of the constant speed drive 14. The second shaft 44 contains output ring gear 62. An oil passage 48 conducts cooling oil from the cooling oil supply (not illustrated) over the peripheral outside surface of the stator 39 of the main generator 23 to cool the generator as in the prior art. Channel 50 couples oil from the passage 48 to a selected surface of the permanent magnet generator 18 to accomplish cooling thereof. Oil running off of the cooled surface of the permanent magnet generator 18 is collected in the main sump 82 of the integrated drive generator 40 which supplies oil to the hydraulic pump and motor combination 66.

While the invention has been described in terms of its preferred embodiment, it should be understood that numerous modifications may be made thereto without departing from the spirit and scope of the present invention as defined in the appended claims. It is intended that all such modifications fall within the scope of the appended claims.

We claim:

1. An integrated drive generator for generating constant frequency alternating current which is driven by a drive shaft at variable rotational speeds comprising:

a constant speed drive including a differential having an input coupled to the drive shaft and a first side of the differential and at least one output coupled to the first side of the differential which rotates at a fixed rotational velocity in response to the drive shaft rotating at a variable velocity and which drives a first drive shaft at a fixed rotational velocity and a second drive shaft at a fixed rotational velocity;

an alternating current generator having a rotor mounted on the first shaft for generating the constant frequency alternating current;

an exciter having a rotor mounted on the first shaft, electrically coupled to a field winding of the alternator, for supplying electrical power to the field winding; and a generator, having a rotor mounted on the second shaft, electrically coupled to the exciter, for supplying electrical power to a field winding of the exciter.

2. An integrated drive generator in accordance with claim 1 wherein:

the generator, having a rotor mounted on the second shaft, has a permanent magnet rotor.

3. An integrated drive generator in accordance with claim 2 wherein the constant speed drive comprises:

a hydraulic pump and motor having an input shaft coupled to the drive shaft and an output;

a differential with a first input coupled to the drive shaft, a second input coupled to the output of the hydraulic pump and motor and an output which is the output of the constant speed drive driving the first and second shafts.

4. An integrated drive generator in accordance with claim 2 wherein:

the fixed rotational velocity of the first shaft is greater than the fixed rotational velocity of the second shaft with a ratio of the rotational velocities being constant.

5. An integrated drive generator in accordance with claim 3 wherein:
the fixed rotational velocity of the first shaft is greater than the fixed rotational velocity of the second shaft with a ratio of the rotational velocities being constant.

6. An integrated drive generator in accordance with claim 4 wherein:
the output of the hydraulic pump and motor is coupled to a first ring gear;
the output of the constant speed drive is coupled to a second ring gear which drives a gear connected to the first shaft; and
the first ring gear is coupled to the second ring gear by a plurality of planetary gears.

7. An integrated drive generator in accordance with claim 2 wherein:
the integrated drive generator has a case containing first and second pairs of bearings for rotationally supporting the first and second shafts, the generator and exciter being disposed between the first pairs of bearings and the output of a differential and the rotor of the permanent magnet generator are supported by the second pair of bearings.

8. An integrated drive generator in accordance with claim 3 wherein:
the integrated drive generator has a case containing first and second pairs of bearings for rotationally supporting the first and second shafts, the generator and exciter being disposed between the first pairs of bearings and the output of the differential and the rotor of the permanent magnet generator are supported by the second pair of bearings.

9. An integrated drive generator in accordance with claim 4 wherein:
the integrated drive generator has a case containing first and second pairs of bearings for rotationally supporting the first and second shafts, the generator and exciter being disposed between the first pairs of bearings and the output of the differential and the rotor of the permanent magnet generator are supported by the second pair of bearings.

10. An integrated drive generator in accordance with claim 5 wherein:
the integrated drive generator has a case containing first and second pairs of bearings for rotationally supporting the first and second shafts, the generator and exciter being disposed between the first pairs of bearings and the output of the differential and the rotor of the permanent magnet generator are supported by the second pair of bearings.

11. An integrated drive generator in accordance with claim 2 further comprising:
an oil supply for providing pressurized oil during generation of alternating current by the alternating current generator;
an oil passage at least partially encircling an outside periphery of a stator of the alternating current generator; and
a channel connecting the oil passage to a surface of the permanent magnet generator to conduct oil from the oil passage to the surface of the permanent magnet generator when the oil supply supplies pressurized oil to the oil passage to cool the alternating current generator.

12. An integrated drive generator in accordance with claim 3 further comprising:
an oil supply for providing pressurized oil during generation of alternating current by the alternating current generator;
an oil passage at least partially encircling an outside periphery of a stator of the alternating current generator; and
a channel connecting the oil passage to a surface of the permanent magnet generator to conduct oil from the oil passage to the surface of the permanent magnet generator when the oil supply supplies pressurized oil to the oil passage to cool the alternating current generator.

13. An integrated drive generator in accordance with claim 4 further comprising:
an oil supply for providing pressurized oil during generation of alternating current by the alternating current generator;
an oil passage at least partially encircling an outside periphery of a stator of the alternating current generator; and
a channel connecting the oil passage to a surface of the permanent magnet generator to conduct oil from the oil passage to the surface of the permanent magnet generator when the oil supply supplies pressurized oil to the oil passage to cool the alternating current generator.

14. An integrated drive generator in accordance with claim 5 further comprising:
an oil supply for providing pressurized oil during generation of alternating current by the alternating current generator;
an oil passage at least partially encircling an outside periphery of a stator of the alternating current generator; and
a channel connecting the oil passage to a surface of the permanent magnet generator to conduct oil from the oil passage to the surface of the permanent magnet generator when the oil supply supplies pressurized oil to the oil passage to cool the alternating current generator.

15. An integrated drive generator in accordance with claim 6 further comprising:
an oil supply for providing pressurized oil during generation of alternating current by the alternating current generator;
an oil passage at least partially encircling an outside periphery of a stator of the alternating current generator; and
a channel connecting the oil passage to a surface of the permanent magnet generator to conduct oil from the oil passage to the surface of the permanent magnet generator when the oil supply supplies pressurized oil to the oil passage to cool the alternating current generator.

16. An integrated drive generator in accordance with claim 7 further comprising:
an oil supply for providing pressurized oil during generation of alternating current by the alternating current generator;
an oil passage at least partially encircling an outside periphery of a stator of the alternating current generator; and
a channel connecting the oil passage to a surface of the permanent magnet generator to conduct oil from the oil passage to the surface of the permanent magnet generator when the oil supply supplies pressurized oil to the oil passage to cool the alternating current generator.

17. An integrated drive generator in accordance with claim 8 further comprising:
   an oil supply for providing pressurized oil during generation of alternating current by the alternating current generator;
   an oil passage at least partially encircling an outside periphery of a stator of the alternating current generator; and
   a channel connecting the oil passage to a surface of the permanent magnet generator to conduct oil from the oil passage to the surface of the permanent magnet generator when the oil supply supplies pressurized oil to the oil passage to cool the alternating current generator.

18. An integrated drive generator in accordance with claim 9 further comprising:
   an oil supply for providing pressurized oil during generation of alternating current by the alternating current generator;
   an oil passage at least partially encircling an outside periphery of a stator of the alternating current generator; and
   a channel connecting the oil passage to a surface of the permanent magnet generator to conduct oil from the oil passage to the surface of the permanent magnet generator when the oil supply supplies pressurized oil to the oil passage to cool the alternating current generator.

19. An integrated drive generator in accordance with claim 10 further comprising:
   an oil supply for providing pressurized oil during generation of alternating current by the alternating current generator;
   an oil passage at least partially encircling an outside periphery of a stator of the alternating current generator; and
   a channel connecting the oil passage to a surface of the permanent magnet generator to conduct oil from the oil passage to the surface of the permanent magnet generator when the oil supply supplies pressurized oil to the oil passage to cool the alternating current generator.

20. An integrated drive generator in accordance with claim 5 wherein:
   the ratio of the velocities of the first shaft to the second shaft is two to one.

21. An integrated drive generator in accordance with claim 6 wherein:
   the ratio of the velocities of the first shaft to the second shaft is two to one.

22. An integrated drive generator in accordance with claim 15 wherein:
   the ratio of the velocities of the first shaft to the second shaft is two to one.

23. An integrated drive generator in accordance with claim 16 wherein:
   the ratio of the velocities of the first shaft to the second shaft is two to one.

24. An integrated drive generator in accordance with claim 2 wherein:
   the generator with a permanent magnet rotor has four poles.

25. An integrated drive generator in accordance with claim 3 wherein:
   the generator with a permanent magnet rotor has four poles.

26. An integrated drive generator in accordance with claim 4 wherein:
   the generator with a permanent magnet rotor has four poles.

27. An integrated drive generator in accordance with claim 5 wherein:
   the generator with a permanent magnet rotor has four poles.

28. An integrated drive generator in accordance with claim 6 wherein:
   the generator with a permanent magnet rotor has four poles.

29. An integrated drive generator in accordance with claim 7 wherein:
   the generator with a permanent magnet rotor has four poles.

30. An integrated drive generator in accordance with claim 11 wherein:
   the generator with a permanent magnet rotor has four poles.

31. An integrated drive generator in accordance with claim 1 wherein:
   the input and output are coaxial.

32. An integrated drive generator in accordance with claim 31 wherein:
   the rotor of the alternating current generator has two poles.

33. An integrated drive generator for generating constant frequency alternating current which is driven by a drive shaft at variable rotational speeds comprising:
   a constant speed drive having an input coupled to the drive shaft and at least one output which rotates at a fixed rotational velocity in response to the drive shaft rotating at a variable velocity and which drives a first drive shaft at a fixed rotational velocity and a second drive shaft at a fixed rotational velocity;
   an alternating current generator which generates the constant frequency alternating current having a rotor mounted on the first shaft the rotor having two poles;
   an exciter having a rotor mounted on the first shaft, electrically coupled to a field winding of the alternator, for supplying electrical power to the field winding; and
   a generator, having a rotor mounted on the second shaft, electrically coupled to the exciter, for supplying electrical power to a field winding of the exciter.

* * * * *